United States Patent [19]

Foster et al.

[11] Patent Number: 4,751,045

[45] Date of Patent: Jun. 14, 1988

[54] PCI RESISTANT LIGHT WATER REACTOR FUEL CLADDING

[75] Inventors: John P. Foster, Monroeville Boro; George P. Sabol, Murrysville Boro, both of Pa.

[73] Assignee: Westinghouse Electric Corp., Pittsburgh, Pa.

[21] Appl. No.: 45,736

[22] Filed: Apr. 29, 1987

Related U.S. Application Data

[63] Continuation of Ser. No. 790,005, Oct. 22, 1985, abandoned.

[51] Int. Cl.[4] .............................................. G21C 3/06
[52] U.S. Cl. .................................................... 376/457
[58] Field of Search ....................... 376/457, 416, 414; 420/422

[56] References Cited

U.S. PATENT DOCUMENTS

| | | | |
|---|---|---|---|
| 2,772,964 | 12/1956 | Thomas et al. | 420/422 |
| 3,148,055 | 9/1964 | Kass et al. | 420/422 |
| 3,243,350 | 3/1966 | Lustman et al. | 376/457 |
| 3,271,205 | 9/1966 | Winton et al. | 376/457 |
| 3,689,324 | 9/1972 | Wiener et al. | 376/457 |
| 3,804,708 | 4/1974 | Nilson | 376/457 |
| 4,000,013 | 12/1976 | MacEwen et al. | 376/457 |
| 4,390,497 | 6/1983 | Rosenbaum et al. | 376/414 |
| 4,584,030 | 4/1986 | McDonald et al. | 376/457 |
| 4,610,842 | 9/1986 | Vannesjo | 376/416 |
| 4,664,881 | 5/1987 | Ferrari et al. | 376/417 |
| 4,675,153 | 6/1987 | Boyle et al. | 376/417 |

FOREIGN PATENT DOCUMENTS

| | | | |
|---|---|---|---|
| 1168769 | 6/1984 | Canada | 376/416 |
| 0121204 | 10/1984 | European Pat. Off. | 420/422 |
| 0155603 | 9/1985 | European Pat. Off. | 376/416 |
| 3442209 | 6/1985 | Fed. Rep. of Germany | 420/422 |
| 0058389 | 4/1984 | Japan | 376/416 |
| 0198483 | 10/1985 | Japan | 376/416 |

Primary Examiner—Deborah L. Kyle
Assistant Examiner—Daniel Wasil

[57] ABSTRACT

A nuclear fuel cladding tube composed of a single zirconium base alloy is provided preferably with a cold worked and stress relieved microstructure throughout. The cladding is characterized by excellent aqueous corrosion resistance as well as excellent resistance to PCI crack propagation. The alloy is selected from a group of zirconium base alloys containing tin, iron, chromium, and/or nickel and low levels of impurities.

12 Claims, No Drawings

PCI RESISTANT LIGHT WATER REACTOR FUEL CLADDING

This application is a continuation of application Ser. No. 790,005 filed Oct. 22, 1985, now abandoned.

BACKGROUND OF THE INVENTION

The present invention pertains to light water reactor zirconium base alloy fuel claddings for application in pressurized water, boiling water and heavy water reactors. It is especially concerned with tubular fuel claddings composed of a single zirconium base material.

In the past, a number of nuclear fuel cladding designs have been proposed, each having the goal of minimizing PCI (pellet-cladding-interaction) crack propagation. These designs have all involved the placing of a comparatively soft material as a thin, inner layer on the inside surface of a conventional zirconium base alloy (e.g. Zircaloy 2 or 4) tube. The cost of the soft material, and the cost for its incorporation into the fuel cladding tube adds significantly to the final cost of the tubing. PCI resistant liner materials have typically had a fully recrystallized microstructure, and relatively low strength and poor aqueous corrosion resistance compared to the conventional cladding materials Zircaloy 2 and 4. These properties have made them unsuitable for use as a material which could form the entire cladding tube. There, therefore, exists a need for a fuel cladding design in which a single material forms the tube and provides a cladding which has a combination of excellent PCI crack propagation resistance, and excellent aqueous corrosion properties as well as good structural mechanical properties.

SUMMARY OF THE INVENTION

In accordance with the present invention, a tubular fuel cladding is provided which is composed of a single zirconium base alloy. The cladding has both excellent aqueous corrosion resistance and excellent PCI crack propagation resistance as well as good structural mechanical properties. Thusly, the need for cladding having two layers (an outer layer for strength and aqueous corrosion resistance bonded to a soft PCI crack propagation resistant inner layer) is eliminated. Preferably the tubular fuel cladding in accordance with the present invention has a cold worked and stress relieved microstructure throughout. While there may be some degree of recrystallized equiaxed grains present in the microstructure, they constitute no more than 10 volume percent of the microstructure. Most preferably there are no observable recrystallized grains, in order to provide the structural mechanical properties to the cladding at a reasonable wall thickness. The alloy utilized may be any one of the following zirconium base alloys:

TABLE I

| Element | Alloy (Weight Percent) | | | | |
|---|---|---|---|---|---|
| | A | B | C | D | E |
| Sn | .2–.6 | .1–.6 | 1.2–1.7 | .15–.6 | .4–.6 |
| Fe | .03–.11 | .04–.24 | .04–.24 | .15–.5 | .1–.3 |
| Cr | | .05–.15 | .05–.15 | | |
| Ni | | ≦.08 | ≦.08 | | .03–.07 |
| O* | <600 | <600 | <600 | <600 | <600 |
| Total Impurities* | <1500* | <1500 | <1500 | <1500 | <1500 |

*in ppm; total impurities including oxygen.

Preferably the fuel cladding in accordance with the present invention has a highly anisotropic texture characterized by a contractile strain ratio of 2 or more, and preferably 2.5 to 3.0, or a Kearns radial f number of at least 0.65 and preferably at least 0.7.

Preferably the oxygen content of the alloys shown in Table I is less than 400 ppm. Preferably the total impurity content is less than 1000 ppm.

These and other aspects of the present invention will become more apparent upon review of the following detailed description of the invention.

DETAILED DESCRIPTION OF THE INVENTION

In accordance with the present invention, a nuclear fuel cladding tube is provided which is composed of a single zirconium base alloy. The alloy selected has a combination of excellent aqueous corrosion resistance, structural properties and PCI resistance. Preferably, the alloy is selected from one of those shown in Table I. Also, in accordance with the present invention, the microstructure of said cladding tube is preferably characterized as a cold worked and stress relieved one, exhibiting less than about 10 volume percent recrystallized grains, and preferably no observable recrystallized grains. It is submitted that a fuel cladding made entirely of one of the alloys shown in Table I and having the aforementioned cold worked and stress relieved microstructure, will have a combination of aqueous corrosion resistance, structural mechanical properties, and PCI resistance making it suitable for use in conventional fuel element designs for PWR and BWR reactors.

Fuel cladding having the alloy C composition may have a final microstructure which is in a stress relieved or partially or fully recrystallized condition. The higher tin content of the alloy C embodiments increases the structural mechanical properties of that alloy compared to the other alloys shown in Table I, thereby allowing fuel cladding composed of alloy C material to also be utilized in the partially and fully recrystallized conditions in addition to the preferred cold worked and stress relieved condition. Preferably the alloy C composition is controlled within one of the following limits as shown in Table II. These alloying element limits correspond to those of Zircaloy-2 and 4 fuel cladding except that the oxygen content has been lowered and the total impurity content is also controlled. Most preferably the oxygen content for the alloys shown in Table II is less than 400 ppm while the total impurity content (including oxygen) is less than 1000 ppm.

TABLE II

| | Alloys (Weight Percent) | |
|---|---|---|
| Element | CI | CII |
| Sn | 1.2–17 | 1.2–1.7 |
| Fe | 0.07–0.20 | 0.18–0.24 |
| Cr | 0.05–0.15 | 0.07–0.13 |
| Ni | 0.03–0.08 | Impurity |
| O | <600 ppm | <600 ppm |
| Total Impurities | <1500 ppm | <1500 ppm |

It is further submitted that the PCI resistance of the fuel cladding in accordance with the present invention may be further improved by controlling the crystallographic texture of the final annealed tube to have a contractile strain ratio of 2 or more, and preferably 2.5 to 3.0, or a Kearns radial f number of at least 0.65 and preferably at least 0.7.

It is submitted that those of ordinary skill in the art may readily fabricate the above-described tubing using the known Zircaloy 2 and 4 fuel cladding fabrication techniques. It is further submitted that the fuel cladding in accordance with the present invention will exhibit PCI resistance similar to that observed in Zircaloy 2 fuel cladding having a low oxygen (<450 ppm), fully recrystallized zirconium liner bonded to its inside diameter surface.

Other embodiments of the present invention will be apparent to those skilled in the art from a consideration of this specification or practice of the invention disclosed herein. It is intended that the specification and examples be considered as illustrative only, with the true scope and spirit of the invention being indicated by the following claims.

We claim:

1. A tubular nuclear fuel element cladding tube, said fuel element cladding tube forming the entire fuel element cladding and consisting of:
    a single continuous wall, said single continuous wall consisting of a single alloy selected from the group consisting of zirconium base alloys A, B, C, D, and E;
    said single continuous wall characterized by a cold worked and stress relieved microstructure throughout;
    wherein said zirconium base alloy A contains 0.2–0.6 w/o Sn, 0.03–0.11 w/o sum of Fe and Cr, § 600 ppm O and § 1500 ppm total impurities;
    said zirconium base alloy B contains 0.1–0.6 w/o Sn, 0.04–0.24 w/o Fe, 0.05–0.15 w/o Cr, § 0.08 w/o Ni, § 600 ppm O, and § 1500 ppm total impurities;
    said zirconium base alloy C contains 1.2–1.7 w/o Sn, 0.04–0.24 w/o Fe, 0.05–0.15 w/o Cr, § 0.08 w/o Ni, § 600 ppm O, and § 1500 ppm total impurities;
    said zirconium base alloy D contains 0.15–0.6 w/o Sn, 0.15–0.5 w/o Fe, § 600 ppm O, and § 1500 ppm total impurities; and
    said zirconium base alloy E contains 0.4–0.6 w/o Sn, 0.1–0.3 w/o Fe, 0.03–0.07 w/o Ni, § 600 ppm O, and § 1500 ppm total impurities.

2. The nuclear fuel element cladding tube in accordance with claim 1 wherein oxygen is less than 400 ppm.

3. The nuclear fuel element cladding tube in accordance with claim 1 wherein total impurities are less than 1000 ppm.

4. The nuclear fuel element cladding tube in accordance with claim 3 wherein oxygen is less than 400 ppm.

5. The nuclear fuel element cladding tube according to claim 1 wherein said single alloy is zirconium base alloy C, containing 1.2–1.7 w/o Sn, 0.07–0.20 w/o Fe, 0.05–0.15 w/o Cr, 0.03–0.08 w/o Ni, <600 ppm O, and less than 1500 ppm total impurities.

6. The nuclear fuel element cladding tube according to claim 1 wherein said single alloy is zirconium base alloy C containing 1.2–1.7 w/o Sn, 0.18–0.24 w/o Fe, 0.07–0.13 w/o Cr, <600 ppm O, and <1500 ppm total impurities.

7. The nuclear fuel element cladding tube according to claim 1 having an anisotropic crystallographic texture characterized by a Kearns f number in the radial direction of greater than 0.65.

8. The nuclear fuel element cladding tube according to claim 1 having an anisotropic crystallographic texture characterized by a contractile strain ratio of greater than 2.0.

9. A nuclear fuel element cladding tube consisting of:
    a single continuous wall, said single continuous wall consisting of a single zirconium base alloy; said alloy consisting essentially of 1.2–1.7 w/o Sn, 0.07–0.20 w/o Fe, 0.05–0.15 w/o Cr, 0.03–0.08 w/o Ni; § 600 ppm O; and less than 1500 ppm total impurities; and said single continuous wall of said fuel element cladding tube having a partially or fully recrystallized microstructure.

10. A nuclear fuel element cladding tube consisting of:
    a single continuous wall, said single continuous wall consisting of a single zirconium base alloy; said alloy consisting essentially of 1.2–1.7 w/o Sn, 0.18–0.24 w/o Fe, 0.07–0.13 w/o Cr, § 600 ppm O, and § 1500 ppm total impurities; and said single continuous wall of said fuel element cladding tube having a partially or fully recrystallized microstructure.

11. The nuclear fuel element cladding tube according to claim 9 having an anisotropic crystallographic texture characterized by a contractile strain ratio of greater than 2.0.

12. The nuclear fuel element cladding tube according to claim 10 having an anisotropic crystallographic texture characterized by a contractile strain ratio of greater than 2.0.

* * * * *